March 12, 1935.  J. J. WHARAM  1,993,950

ASH TRAY

Filed Nov. 17, 1933

INVENTOR.
John J. Wharam
BY
ATTORNEY.

Patented Mar. 12, 1935

1,993,950

UNITED STATES PATENT OFFICE 1,993,950

ASH TRAY

John J. Wharam, Dearborn, Mich., assignor to Ford Motor Company, Dearborn, Mich., a corporation of Delaware Application November 17, 1933, Serial No. 698,475

6 Claims. (Cl. 206—19.5)

The object of my invention is to provide an ash tray especially suitable for use on the instrument board of an automobile.

My device is not intended to be an accessory, but rather, is designed to be incorporated in the vehicle by the manufacturer.

Certain features are desirable in devices of this kind, namely:

The ash container should be conveniently accessible when desired but should be readily closed or pushed out of sight when not needed.

The device must not rattle, either when opened or closed.

The ash receiving opening should be covered when the device is closed to prevent draft from blowing ashes around the interior of the car.

The device should be small and inconspicuous so as to be readily installed in any convenient although non-symmetrical location on the instrument board, while the ash container should have a large capacity. The container should further be readily removable for emptying, and where the instrument board is grained to resemble wood, the exposed portion of the device, especially if placed in a non-symmetrical position, should readily be grained to match the board and carry out the grain configuration thereon. Some of these features have been incorporated in ash trays heretofore available, however, it is the purpose of this application to describe a device which incorporates each and all of these features.

Still a further object of my invention is to provide a device of the character described which will be comparatively inexpensive to manufacture and which will require a negligible amount of service.

With these and other objects in view, my invention consists in the arrangement, construction and combination of the several parts comprising my improved device, as described in the specification, claimed in my claims, and illustrated in the accompanying drawing, in which:

Figure 2:
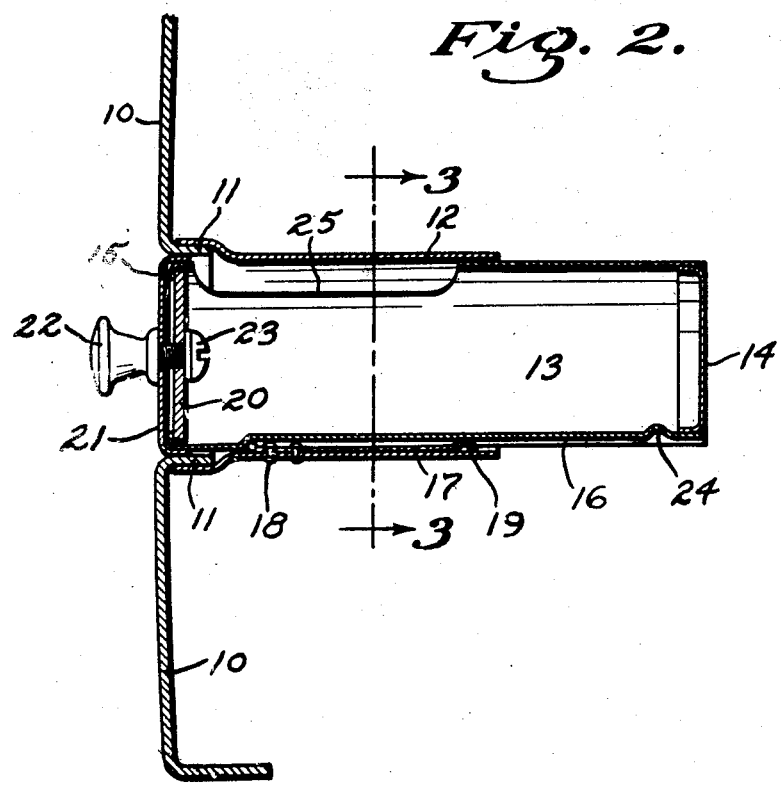
Figure 2 shows a vertical, central, sectional view through my improved ash receiver.
Figure 3:
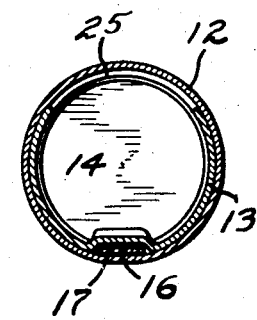
Figure 3 is a sectional view taken on the line 3—3 of Figure 2.
Figure 1:
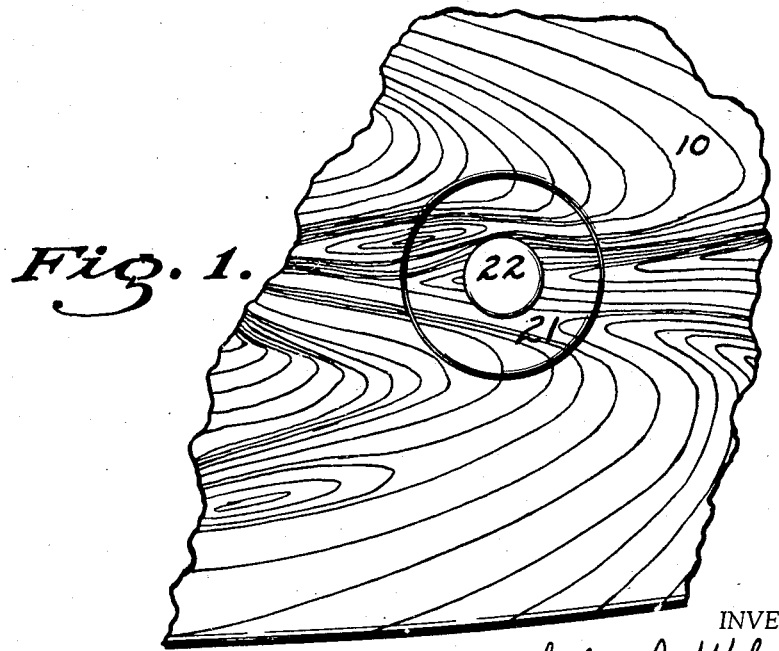
Figure 1 shows a plan view of an instrument panel having my improved ash receiver installed thereon.

Referring to the accompanying drawing, I have used the reference numeral 10 to indicate generally the instrument board associated with an automobile body. This panel is provided with a cylindrical opening therein, the opening having an inturned cylindrical flange 11 therearound which is formed from the metal of the instrument board. A sleeve or container guide member 12 is provided, this sleeve having one end thereof expanded so as to fit over the flange 11, the major portion of the sleeve having the same diameter as the opening 10. This guide is spot-welded at several places to the flange 11 so that it is permanently secured to the instrument board.

The container portion of this device comprises a tubular member 13 which is about twice the length of the sleeve 12 and which tubular member 13 has a head 14 secured in its rearmost end while the opposite or front end is flanged inwardly as at 15. A groove 16 is stamped along one side of the member 13 and extends almost the full length of the tube, that is, from the rearmost end to position spaced about one-half inch from the flange 15. A flat spring 17 is secured to the sleeve 12 by rivets 18 and a detent 19 is formed on the rearmost end of this spring, the spring extending longitudinally relative to the sleeve 12. This spring is of such width that it closely fits within the groove 16 to thereby prevent rotation of the container 13.

Diametrically opposite to the groove 16 I have provided an elongated opening 25 in the tube 13, which opening extends about one-half the length of the tube. The opening is located toward the forward end of the tube so that upon moving the container outwardly the opening 25 will be exposed in front of the instrument panel.

In order to form a closure for the forward end of the tube 13 I have provided a washer 20 which is located on the inside of the flange 15 while a cap 21 covers the outside of this flange. A knob 22 is held in place by means of a screw 23 which extends through central openings in the washer 20 and cap 21 to thereby detachably secure the cap 21 to the flange 15 and fix the knob 22 in place.

In the device shown the forward end of the spring 17 is located so that it abuts the forward end of the groove 16 when the cap 21 is flush with the instrument panel thereby forming a positive stop for the container when in its closed position. In order to limit the normal outward movement of the container so that the opening 25 is exposed in front of the instrument panel but with the container still retained in the guide sleeve, I have provided a notch 24 in the bottom of the groove 16 and near its rearmost end, into which notch the detent 19 is urged when the tube 13 is pulled outwardly to its normal open position.

In the normal operation of the device, the operator simply pulls the knob 22 until the detent 19 snaps into the notch 24. When it is desired to empty the device the knob is pulled still farther against the action of the detent 19. The container is thus drawn free from the guide sleeve 12.

It should be noted that the opening 25 is completely covered by the sleeve 13 when the container is closed to thereby prevent ashes from blowing around the car.

A very important feature in connection with this device is that the single spring 17 forms a limiting stop for the closed position of the device. This spring also prevents rattling of the container. Still further, the spring forms a resilient means for limiting the normal outward movement of the container to its open position. And still further, the spring forms a means for positively preventing rotation of the container.

It will further be noted that the detachable cap 41 may be conveniently paneled or grained while the instrument board is being finished. Instrument boards in most automotive vehicles are at the present time made of metal and in most of these vehicles the metal is grained to resemble various kinds of wood. Probably the best and at least the most extensively used graining process comprises, photographing a treated wooden panel upon a sensitized copper plate, then etching the plate, then applying ink to the etched plate, then transferring this design to a soft rubber roller and then transferring the design from the roller to the instrument board. In transferring the design from the roller to the board, the former is simply rolled over the board so that if the design of the grain on the cap 21 is to carry out the configuration or the design of the rest of the graining, then the cap must be inserted in the instrument panel opening when the graining is being done. This procedure may be accomplished with the applicant's device whereas, if the cap were integral with the container, then it would be impractical to grain both the container and instrument board simultaneously.

It is highly desirable that the graining of the cap match the instrument board because in many installations the ash receiver may not be placed in position symmetrical to the instruments on the board so that any contrast between the finish on the cap and board will not create a pleasing impression. The applicant's cap 21 may be formed, grained, varnished and rubbed, simultaneously with the instrument board so that finally when the board is assembled in a car and the instruments are being installed, then this cap may be fastened to the forward end of the ash container and rotated until the grain configuration matches the board at which position it may be secured.

Some changes may be made in the arrangement, construction and combination of the various parts of my improved device without departing from the spirit of my invention, and it is my intention to cover by my claims, such changes as may reasonably be included within the scope thereof.

I claim as my invention:

1. An ash receiver especially suitable for installation upon the instrument panel of an automobile comprising, a guide sleeve fixedly secured to said instrument panel in position projecting rearwardly therefrom, a resilient detent associated with said sleeve, a container member slidably mounted to move lengthwise in said sleeve, said container having a longitudinally extending groove in one wall thereof in which said detent slides and said groove having a notch therein into which said detent is urged when the container is withdrawn to its normal open position, said detent resiliently resisting the complete withdrawal of said container from said guide sleeve and said detent positively resisting rotation of said container in said guide sleeve.

2. A device, as claimed in claim 1, said sleeve and container comprise a pair of concentrically disposed tubular members.

3. A device, as claimed in claim 1, wherein said resilient detent comprises a flat leaf spring, the free end of which is deformed to form said detent.

4. An ash receiver especially suitable for installation upon the instrument panel of an automobile comprising, a tubular guide sleeve fixedly secured to said instrument panel in position projecting rearwardly therefrom, a flat leaf spring having its forward end secured to the forward interior portion of said sleeve, so that said spring may deflect radially with the free end of said spring extending axially and rearwardly through said sleeve, and said free end forming a detent, a tubular container slidably mounted to move lengthwise in said guide sleeve, said container having a longitudinally extending groove formed in one wall thereof in which said spring is disposed so that rotation of said container in the sleeve is prevented, said groove also having a notch formed therein into which said detent is urged when the container is withdrawn to its normal open position, the fixed end of said spring coacting with the forward end of said groove to form a stop which defines the closed position of said container.

5. A device, as claimed in claim 4, wherein said guide sleeve is mounted in a horizontal position with said spring disposed along its lower side, and wherein said tubular container is provided with an opening in its upper forward portion, which opening is completely covered by the guide sleeve when the container is in its closed position.

6. An ash receiver especially suitable for installation upon an instrument panel of an automobile, said panel having been grained to resemble wood, comprising, a guide sleeve fixedly secured to said instrument board in position projecting rearwardly therefrom, a tubular container slidably mounted in said sleeve having a longitudinally extending groove formed therein, a spring urged detent fixed to said sleeve, said detent coacting with said groove to positively resist rotary movement of said container and resiliently resist longitudinal movement thereof, and the detachable cap secured over the exposed end of said container in position flush with the instrument board, said cap being grained so that its design carries out the configuration of said board.

JOHN J. WHARAM.